United States Patent [19]
Kim et al.

[11] Patent Number: 5,703,139
[45] Date of Patent: Dec. 30, 1997

[54] PHOTO-CURABLE RESIN COMPOSITION AND PRODUCT COATED THEREWITH

[75] Inventors: Sang-Keun Kim; Seoung-Ho Kim; Haeng-Woo Lee; Cheol-Kyu Choi, all of Yousung-Ku; Jeong-Deuk Kim, Kangnam-Ku; Jin-Who Hong; Chang-Soo Kim, both of Bundang-gu; Kong-Hyun Whang, Kangnam-gu, all of Rep. of Korea

[73] Assignee: HANWHA Chemical Corporation, Seoul, Rep. of Korea

[21] Appl. No.: 534,719

[22] Filed: Sep. 27, 1995

[30] Foreign Application Priority Data

Sep. 27, 1994 [KR] Rep. of Korea ............ 94-24336

[51] Int. Cl.$^6$ ............................................. C08F 2/46
[52] U.S. Cl. .................... 522/42; 522/90; 522/174; 522/175
[58] Field of Search .................. 522/42, 90, 174, 522/175

[56] References Cited

U.S. PATENT DOCUMENTS

| | | | |
|---|---|---|---|
| 3,933,697 | 1/1976 | Fujii et al. | 521/159 |
| 5,075,345 | 12/1991 | Mayer et al. | 521/159 |

FOREIGN PATENT DOCUMENTS

| | | | |
|---|---|---|---|
| 0 541 289 | 5/1993 | European Pat. Off. | |
| 93-13027 | 7/1993 | Rep. of Korea. | |

*Primary Examiner*—Mark Chapman
*Attorney, Agent, or Firm*—Birch, Stewart, Kolasch & Birch, LLP

[57] ABSTRACT

The present invention relates to a photo-curable resin composition which shows an excellent antistatic property and staining resistance by introducing aliphatic trifunctional urethane acrylate prepolymer therein and to a product coated with said resin composition. Specifically, the photo-curable resin composition according to the present invention are useful for coating a product made from metacrylate resin, vinylchloride resin, ABS resin or carbonate resin. The photo-curable resin composition according to the present invention can comprise reactive diluent, photoinitiator and additives in addition to said prepolymer.

13 Claims, No Drawings

PHOTO-CURABLE RESIN COMPOSITION AND PRODUCT COATED THEREWITH

BACKGROUND OF INVENTION

1. Field of Invention

The present invention relates to a photo-curable resin composition. More specifically, the present invention relates to a photo-curable resin composition which shows excellent antistatic properties and staining resistance by introducing into it aliphatic trifunctional urethane acrylate prepolymer.

The present invention also relates to a product coated with the photo-curable resin composition as mentioned above.

2. Background Art

Generally, staining problems were serious in base materials manufactured from vinyl chloride resin or ABS resin. Therefore, methods for improving the staining resistance of such materials by coating them with UV curable coating materials were well known.

For example, Korean Laid-open Patent Publication No. 93-13027 discloses an early-stage UV curable resin composition comprising as a main component a prepolymer prepared from a polyether polyol or polyester polyol, an aliphatic or aromatic multi-functional isocyanate and as additional components methacrylate containing hydroxy functional groups and further several UV curable monomers. However, said resin composition has a limitation on improving the staining resistance of a product. On the other hand, a photo-curable coating material made from urethane acrylate prepolymer shows weak antistatic properties due to the polymer structures which does not have any quaternary ammonium salt. That is, the early-stage coating materials have a tendency to be stained easily by adsorbing dusts which are dispersed through atmosphere and thus formed stains, especially caused by oily substances such as Magic Marker, are not easily washed out.

Thus, it has been required to develop a new resin composition as a coating material which shows a superior staining resistance and antistatic properties in contrast to the known resin compositions, and simultaneously maintains its chemical and physical properties such as adhesion strength to base materials as good as before.

Accordingly, the present inventors have focussed their attention on this point and have extensively studied for a long time, and consequently found an astonishing fact that such purpose can be satisfied by introducing a specific aliphatic trifunctional urethane acrylate prepolymer into a conventional photo-curable resin composition, and thus completed the present invention.

Therefore, it is an object of the present invention to provide a photo-curable resin composition comprising an aliphatic trifunctional urethane acrylate prepolymer.

It is another object of the present invention to provide a photo-curable resin composition comprising a reactive diluent, a photoinitiator and other additives in addition to said aliphatic trifunctional urethane acrylate prepolymer.

It is a further object of the present invention to provide a product prepared by coating a resin such as methylmethacrylate resin, vinylchloride resin, ABS resin or carbonate resin etc. with the photo-curable resin composition as mentioned above in the thickness of 1 to 100 μm and then photo curing said photo-curable resin composition.

The foregoing has outlined some of the more pertinent objects of the present invention. These objects should be construed to be merely illustrative of some of the more pertinent features and applications of the invention. Many other beneficial results can be obtained by applying the disclosed invention in a different manner or modifying the invention within the scope of the disclosure. Accordingly, other objects and a more thorough understanding of the invention may be had by referring to the disclosure of invention, in addition to the scope of the invention defined by the claims.

DISCLOSURE OF INVENTION

In one aspect, the present invention relates to a photo-curable resin composition comprising an aliphatic trifunctional urethane acrylate prepolymer having the following formula (I) as an effective component:

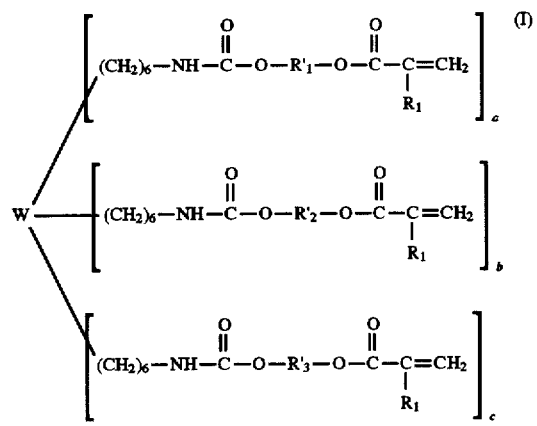

in which

W represents

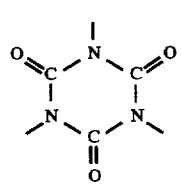

$R_1$ represents hydrogen or methyl;

$R_1'$ represents

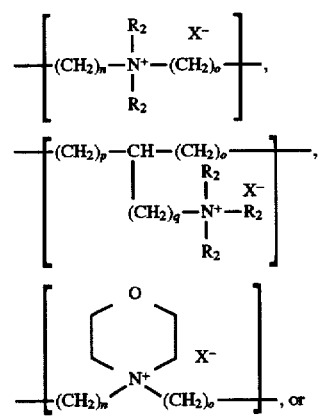

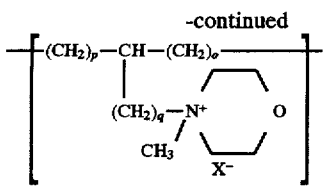

wherein X represents a chlorine or bromine atom, $R_2$ represents methyl or ethyl, n, o and q independently of one another denote an integer of 1 to 6 and p denotes an integer of 0 to 6;

$R_2'$ and $R_3'$ are identical to or different from each other and represent

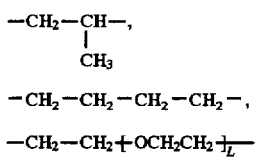

wherein L denotes an integer of 0 to 5, or

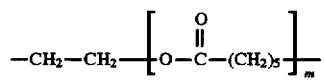

wherein m denotes an integer of 1 to 6;

a, b and c independently of one another represent a real number of 3 or less, provided that they satisfy the conditions of $0<a\leq 3$, $0\leq b$ and/or $c<3$ and a +b+c=3.

The prepolymer of the above formula (I) can be prepared by reacting an aliphatic multifunctional isocyanate having the following formula (II) with a quaternary ammonium salt having the following formula (III), optionally with the compound of the following formula (IV) and/or that of the following formula (V).

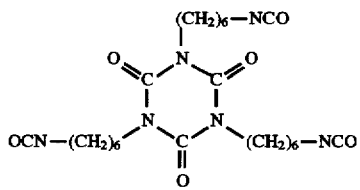 (II)

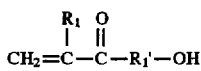 (III)

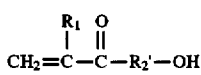 (IV)

 (V)

In the above formulae, $R_1$, $R_1'$, $R_2'$ and $R_3'$ are defined as previously described.

The aliphatic multifunctional isocyanate of formula (II) which can be used in this reaction includes isocyanurate type trimers of isophorone diisocyanate or hexamethylene diisocyanate. Among them, isocyanurate-type trimer of hexamethylena diisocyanate is more preferable, and as its commercially available articles, Luxate HT2000 (Olin Corp.) and Coronate HX (Nippon Polyurethane Ind. Co., Ltd.) can be mentioned.

One of the most important characteristics of the prepolymer of formula (I) contained in the photo-curable resin composition according to the present invention is that the quaternary ammonium salt of formula (III) is introduced therein. The quaternary ammonium salt of formula (III) is consisted of quaternary ammonium group and hydroxy group. Among these two groups, the quaternary ammonium group has a function to improve the antistatic properties and staining resistance of the coating material and the hydroxy group is reacted with the isocyanate functional group of formula (II) to produce the desired prepolymer.

The compounds of formulae (IV) and (V) are hydroxyalkyl methacrylate (or hydroxyalkyl acrylate) compounds which have methacryl (or acryl) and hydroxy functional groups in their structure and at the same time do not include any quaternary ammonium salts. These compounds (IV) and (V) are optionally used to control the physicochemical properties (for example, flexibility) of the prepolymer (I) according to the present invention. The compounds of formulae (IV) and (V) can be exemplified by hydroxyethyl (meth)acrylate, hydroxypropyl(meth)acrylate or hydroxybutyl acrylate, however, they are not restricted only to these. As their commercially available articles, hydroxyethyl acrylate, hydroxypropyl acrylate, Sipomer HEM (Rhone-Poutene), Placcel (Daicel Chemical Ind., Ltd.) and Tone Monomer (Union Carbide Co.) can be mentioned.

It is preferable to use the total hydroxy groups which exist in the compounds of formula (III), (IV) and (V) in a ratio of 1:1 equivalents with respect to the isocyanate group in the compound of formula (II). There is no restriction on the ratio between the amount of the compounds (III), (IV) and (V) used, that is, on the ratio between a, b and c in formula (I), but it is preferable that a is 0.3 to 2.0 when the sum of a, b and c is 3. In case a exceeds 2.0, there can occur some deterioration in the flexibility and gloss of the product.

In addition, the photo-curable resin composition according to the present invention can preferably comprise the prepolymer of formula (I) in an amount of 5 to 70 parts by weight with respect to 100 parts by weight of the resin composition.

When the prepolymer of formula (I) is used in an amount of 5 parts by weight or less, good staining resistance and antistatic properties may not be obtained. And when the prepolymer is used in an amount of 70 parts by weight or more, suitable surface hardness and coating layer strength as a protective coating material cannot be established. Further, the photo-curable resin composition according to the present invention can comprise a reactive diluent, a photoinitiator and other additives in addition to said prepolymer.

As the reactive diluent for the present invention, one or more selected from various acrylates and acrylate esters such as hydroxyethyl acrylate, hydroxypropyl acrylate, hexanediol diacrylate, tripropyleneglycol diacrylate and trimethylolpropane triacrylate, etc. can be used.

The photoinitiator which can be used in the present invention, 1-hydroxycyclohexyl ketone (of which trademark is Irgacure 184) and/or 2-hydroxy-2-methyl-1-phenylpropan-1-one can be mentioned. And in the present invention, it is preferable to use said photoinitiator in an amount of 1 to 5 parts by weight with respect to 100 parts by weight of the final resin composition.

Also, as the additives which are incorporated in order to improve the overall physicochemical properties of the resin composition according to the present invention, a leveling agent (trademark: BYK 307) and a thickening agent (trademark: R 972) can preferably be used in the total amount of 0.1 to 2 parts by weight.

In the second aspect, the present invention also relates to a product prepared by coating methylmethacrylate resin, vinyl chloride resin, ABS resin or carbonate resin with the resin composition according to the present invention.

By coating the surface of the resin listed above with the photo-curable resin composition according to the present invention in a thickness of 1 to 100 μm and then photo-curing said resin composition, the product of the present invention can be prepared as having improved antistatic property and staining resistance.

The present invention will be more specifically explained in the following examples. However, it should be understood that the following preparations and examples are intended to illustrate the present invention and not to limit the scope of the present invention in any manner.

PREPARATION 1

Synthesis of methacryloxyethyldimethyl (hydroxyethyl) ammonium bromide 31.4 g (0.2 mole) of (dimethylamino)ethyl methacrylate was introduced into a 250 ml three-neck flask equipped with ice-bath, thermometer, refluxing condenser, dropping funnel and magnetic stirring bar. The compound was stirred and then the temperature thereof was lowered to −10° C. 25 g (0.2 mole) of bromoethanol was added dropwise thereto over 30 minutes while maintaining the temperature of the contents at 0° C. or less. After the addition was complete the reaction mixture was stirred for 24 hours at room temperature. 100 ml of ethyl acetate was added to the mixture and the whole was stirred, filtered and dried to obtain 54 g (Yield: 96%) of the title compound as a white powder.

$^1$H NMR (DMSO-d$_6$, 300 MHz): δ6.18(1 H), 5.85(t,J=1.5 Hz,1 H), 5.43(t,J=5.1,1 H), 4.63(br.s,2 H), 3.95(br.m, 2 H), 3.88(br.m,2 H), 3.62(br.t,J=5.4,4.5 Hz, 2 H), 3.26(s,6 H), 2.0(s,3 H)

PREPARATION 2

74.50 g (0.264 mole) of methacryloxyethyldimethyl (hydroxyethyl) ammonium bromide prepared in Preparation 1, 204.3712 g (1.76 mole) of hydroxyethyl acrylate and 211.904 g (0.616 mole) of caprolactone modified hydroxyethyl acrylate (Tone M-100; UCC Co.) were mixed together to produce a monomer mixture. On the other hand, 473.2392 g (0.800 mole) of isocyanurate-type trimer of 1,6-hexamethylene diisocyanate (Coronate-HX; Nippon Polyurethene Ind. Co., Ltd.), 0.048 g of dibutyl tin dilaurate as a catalyst and 0.241 g of octadecyl-3-(3,5-di-tertbutyl-4-hydroxyphenyl)propionate (Irganox 1076: Ciba-Geigy Co.) as a radical scavenger were introduced into a reactor equipped with a thermometer and the temperature of the mixture was controlled at 50° C. while stirring at the rate of 200 rpm. After the temperature was equilibrated, the previously prepared monomer mixture was added dropwise thereto over 2 hours with air bubbling, during which the reaction temperature was maintained at less than 60° C. After addition, the temperature of the contents was elevated to 80° C. and 0.096 g of dibutyl tin dilaurate was added thereto and then the mixture was reacted for more than 2 hours. 0.048 g (about 50 ppm) of TNPP (tris(nonylphenyl) phosphite) was added as a stabilizer in order to complete the reaction, and consequently about 964 g of the prepolymer of which weight percent of NCO group is 0.0 (ASTM D 2572-80) and the Number Average Molecular Weight is 1970 (GPC, measured by CHCl$_3$) was obtained.

$^1$H NMR (CDCl$_3$, 300 MHz): δ4.3(—COOCH$_2$CH$_2$OCO—), 3.5 (CH$_3$$^+$NCH$_3$Br$^-$), 3.2–3.0(—NHCOO—), 2.2–2.3 (—CH$_2$COO—)

PREPARATION 3

225.8 g (0.8 mole) of methacryloxyethyldimethyl (hydroxyethyl) ammonium bromide prepared in Preparation 1 and 255.5 g (2.2 mole) of hydroxyethyl acrylate were mixed together to produce a monomer mixture. On the other hand, 591.55 g (1.0 mole) of isocyanurate-type trimer of 1,6-hexamethylene diisocyanate (Coronate-HX; Nippon Polyurethene Ind. Co., Ltd.), 0.05 g of dibutyl tin dilaurate as a catalyst and 0.27 g of octadecyl-3-(3,5-di-tertbutyl-4-hydroxyphenyl)propionate (Irganox 1076: Ciba-Geigy Co.) as a radical scavenger were introduced into a reactor equipped with a thermometer and the temperature of the mixture was controlled at 50° C. while stirring at the rate of 200 rpm. After the temperature was equilibrated, the previously prepared monomer mixture was added dropwise thereto over 2 hours with bubbling air, during which the reaction temperature was maintained at less than 60° C. After addition, the temperature of the contents was elevated to 80° C. and 0.1 g of dibutyl tin dilaurate was added thereto and then the mixture was reacted for more than 2 hours. 0.05 g (about 50 ppm) of TNPP (tris(nonylphenyl)phosphite) was added as a stabilizer in order to complete the reaction, and consequently about 1073 g of the prepolymer of which weight percent of NCO group is 0.0 (ASTM D 2572-80) and the Number Average Molecular Weight is 1520 (GPC, measured by CHCl$_3$) was obtained.

$^1$H NMR (CDCl$_3$, 300 MHz): δ4.3 (—COOCH$_2$CH$_2$OCO—), 3.5 (CH$_3$$^+$NCH$_3$Br$^-$), 3.2–3.0 (—NHCOO—)

COMPARATIVE PREPARATION 1

306 g (2.6 mole) of hydroxyethyl acrylate and 227 g (0.66 mole) of caprolactone modified hydroxyethyl acrylate were mixed together to produce a monomer mixture. On the other hand, 591.55 g (1.0 mole) of isocyanurate-type trimer of 1,6-hexamethylene diisocyanate (Coronate-HX; Nippon Polyurethene Ind. Co., Ltd.), 0.05 g of dibutyl tin-dilaurate as a catalyst and 0.27 g of octadecyl-3-(3,5-di-tertbutyl-4-hydroxyphenyl)propionate (Irganox 1076: Ciba-Geigy Co.) as a radical scavenger were introduced into a reactor equipped with a thermometer and the temperature of the mixture was controlled at 50° C. while stirring at the rate of 200 rpm. After the temperature was equilibrated, the previously prepared monomer mixture was added dropwise thereto over 2 hours with bubbling air, during which the reaction temperature was maintained at less than 60° C. After addition, the temperature of the contents was elevated to 80° C. and then the mixture was reacted for more than 2 hours. 0.05 g (about 50 ppm) of TNPP (tris(nonylphenyl) phosphite) was added as a stabilizer in order to complete the reaction, and consequently about 1124 g of the prepolymer of which weight percent of NCO group is 0.0 (ASTM D 2572-80) and the Number Average Molecular Weight is 2220 (GPC, measured by CHCl$_3$) was obtained.

$^1$H NMR (CDCl$_3$, 300 MHz): δ4.3(—COOCH$_2$CH$_2$OCO—), 3.2–3.0 (—NHCOO—), 2.2–2.3(—CH$_2$COO—)

EXAMPLE 1

50 g of the prepolymer prepared in Preparation 2, 25 g of hydroxyethyl acrylate, 15 g of hexanediol diacrylate, 5 g of trimethylolpropane triacrylate, 4 g of 1-hydroxycyclohexyl phenyl ketone (trademark Irgacure 184; Ciba-Geigy Co.) as a photoinitiator and 1 g of polyether-modified dimethylsiloxane copolymer (trademark BYK-307; BYK-Chemie GmbH) as a levelling agent were thoroughly mixed together to prepare a photo-curable resin composition. A glass plate was coated with that resin composition in a thickness of 10 μm and cured with 80W/cm of light from a medium pressure mercury lamp of conventional UV equipment. The cured resin film was peeled from the glass plate. The physicochemical properties of the thus obtained free-standing cured film are described in the following Table 1.

EXAMPLE 2

50 g of the prepolymer prepared in Preparation 3, 25 g of hydroxyethyl acrylate, 15 g of hexanediol diacrylate, 5 g of trimethylolpropane triacrylate, 4 g of 1-hydroxycyclohexyl phenyl ketone (trademark Irgacure 184; Ciba-Geigy Co.) as a photoinitiator and 1 g of polyether-modified dimethylsiloxane copolymer (trademark BYK-307; BYK-Chemie GmbH) as a levelling agent were thoroughly mixed together to prepare a photo-curable resin composition. A glass plate was coated with that resin composition in a thickness of 10 μm and cured with 80 W/cm light from a medium pressure mercury lamp of conventional UV equipment. The cured resin film was peeled from the glass plate. The physicochemical properties of thus obtained free-standing cured film are described in the following Table 1.

EXAMPLE 3

5 g of the prepolymer prepared in Preparation 2, 45 g of the prepolymer prepared in Comparative Preparation 1, 25 g of hydroxyethyl acrylate, 15 g of hexanediol diacrylate, 5 g of trimethylolpropane triacrylate, 4 g 1-hydroxycyclohexyl phenyl ketone (of trademark Irgacure 184; Ciba-Geigy Co.) as a photoinitiator and 1 g of polyether-modified dimethyl-siloxane copolymer (of which trade mark is BYK-307; BYK-Chemie GmbH) as a levelling agent were thoroughly mixed together to prepare a photo-curable resin composition. A glass plate was coated with that resin composition in a thickness of 10 μm and cured with 80 W/cm light from a medium pressure mercury lamp of conventional UV equipment. The cured resin film was peeled from the glass plate. The physicochemical properties of thus obtained free-standing cured film are described in the following Table 1.

COMPARATIVE EXAMPLE 1

50 g of the prepolymer prepared in Comparative Preparation 1, 25 g of hydroxyethyl acrylate, 15 g of hexanediol diacrylate, 5 g of trimethylolpropane triacrylate, 4 g of 1-hydroxycyclohexyl phenyl ketone (trademark Irgacure 184; Ciba-Geigy Co.) as a photoinitiator and 1 g of polyether modified dimethylsiloxane copolymer (trademark is BYK-307; BYK-Chemie GmbH) as a levelling agent were thoroughly mixed together to prepare a photo-curable resin composition. A glass plate was coated with that resin composition in a thickness of 10 μm and cured with 80 W/cm light from a medium pressure mercury lamp of conventional UV equipment. The cured resin film was peeled from the glass plate. The physicochemical properties of thus obtained free-standing cured film are described in the following Table 1.

TABLE 1

|  | EX. 1 | EX. 2 | EX. 3 | COM. EX. 1 |
|---|---|---|---|---|
| Surface Resistance (Ω) |  |  |  |  |
| Initial | $10^{12}$ | $10^{11}$ | $10^{13}$ | $10^{16}$ |
| After 2 months | $10^{12}$ | $10^{11}$ | $10^{13}$ | $10^{16}$ |
| Electrostatic Decay Time (mili second, 50% Cut Off) | 0.2 | 0.1 | 0.5 | >$10^5$ |
| Flexibility (mm) | 3.2 | 3.2 | 3.2 | 3.2 |
| Adhesion Strength | 100/100 | 100/100 | 100/100 | 100/100 |
| Staining Resistance | 1 | 1 | 1 | 2 |

TABLE 1-continued

*Note:
Surface Resistance: ASTM D-257
Electrostatic Decay Time: 5 kV DC Charge
Flexibility: Minimum diameter at which the test sample does not break by Cylindrical Mandrel Test (ASTM D-522)
Staining Resistance: Scribble on the coated glass plate using an oil magic marker and wipe it out by tissue paper. Then, determine the staining level. There remains no traces (1); there remains some traces (2); and the scribble does not erased (3).
Adhesion Strength: Cut the 100 crosshatch lines on the coated polyvinylchloride sheet in a width of 1 mm and then calculate the number of coating layers which remains on the plate after detaching them from the plate using adhesive tape.

What is claimed is:

1. A photo-curable resin composition comprising a prepolymer having the following formula (I):

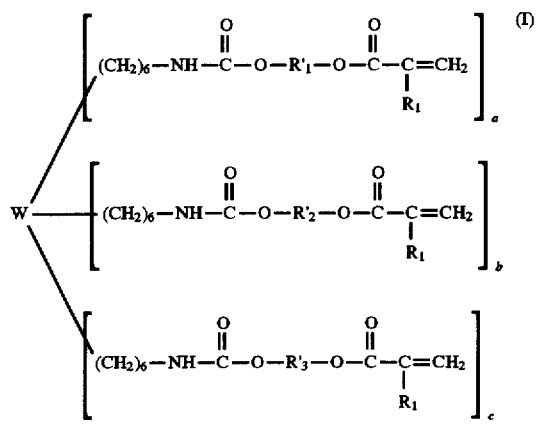

in which

W represents

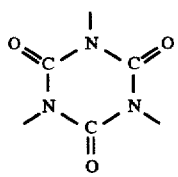

$R_1$ represents hydrogen or methyl;

$R_1'$ represents

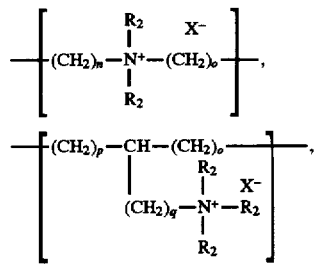

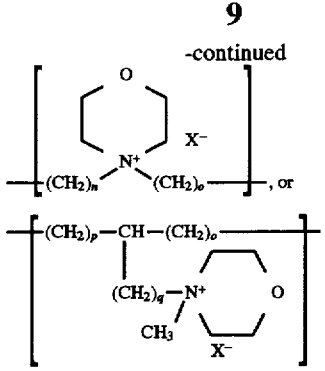

wherein X represents a chlorine or bromine atom, $R_2$ represents methyl or ethyl, n, o and q independently of one another denote an integer of 1 to 6 and p denotes an integer of 0 to 6;

$R_2'$ and $R_3'$ are identical to or different from each other and represent

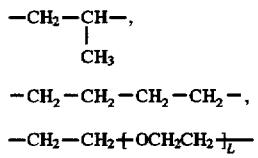

wherein L denotes an integer of 0 to 5, or

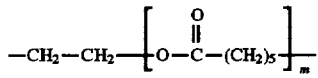

wherein m denotes an integer of 1 to 6;

a, b and c independently of one another represent a real number of 3 or less, provided that they satisfy the conditions of $0<a\leq3$, $0\leq b<3$ and $0\leq c<3$ and $a+b+c=3$.

2. The photo-curable resin composition according to claim 1, wherein the composition further comprises a reactive diluent and a photoinitiator.

3. The photo-curable resin composition according to claim 2, comprising 5 to 70 parts by weight of the prepolymer having the formula (I), 30 to 90 parts by weight of the reactive diluent and 1 to 5 parts by weight of the photoinitiator are used with respect to 100 parts by weight of the resin composition.

4. The photo-curable resin composition according to claim 3, wherein said reactive diluent is one or more selected from the group consisting of hydroxyethyl acrylate, hydroxypropyl acrylate, hexanediol diacrylate, tripropyleneglycol diacrylate and trimethylolpropane triacrylate.

5. The photo-curable resin composition according to claim 3, wherein said photoinitiator is at least one of 1-hydroxycyclohexylphenyl ketone and/or 2-hydroxy-2-methyl-1-phenylpropan-1-one.

6. The photocurable composition of claim 3, further comprising 0.1 to 2 parts by weight at a leveling agent.

7. The photocurable composition of claim 6, wherein said reactive diluent is at least one selected from the group consisting of hydroxyethyl acrylate, hydroxypropyl acrylate, hexanediol diacrylate, tripropyleneglycol diacrylate and trimethylolpropane triacrylate.

8. The photo-curable resin composition according to claim 2, wherein said reactive diluent is at least one selected from the group consisting of hydroxyethyl acrylate, hydroxypropyl acrylate, hexanediol diacrylate, tripropyleneglycol diacrylate and trimethylolpropane triacrylate.

9. The photo-curable resin composition according to claim 2, wherein said photoinitiator is at least one of 1-hydroxycyclohexylphenyl ketone and 2-hydroxy-2-methyl-1-phenylpropan-1-one.

10. A product prepared by coating methylmetacrylate resin, vinylchloride resin, ABS resin or carbonate resin with the photo-curable resin composition as defined in claim 2 in the thickness of 1 to 100 μm and then photo curing sid photo-curable resin composition.

11. The photocurable composition of claim 3, further comprising at least one of a thickener and a leveling agent.

12. The photocurable composition of claim 11, wherein said reactive diluent is at least one selected from the group consisting of hydroxyethyl acrylate, hydroxypropyl acrylate, hexanediol diacrylate, tripropyleneglycol diacrylate and trimethylolpropane triacrylate.

13. A product prepared by coating methylmethacrylate resin, vinylchloride resin, ABS resin or carbonate resin with the photo-curable resin composition as defined in claim 1 in the thickness of 1 to 100 μm and then photo curing said photo-curable resin composition.

\* \* \* \* \*